United States Patent
Patel et al.

(10) Patent No.: US 6,873,333 B1
(45) Date of Patent: Mar. 29, 2005

(54) COMPUTER SYSTEM WITH POST SCREEN FORMAT CONFIGURABILITY

(75) Inventors: Rahul G. Patel, Houston, TX (US); Paul J. Broyles, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1146 days.

(21) Appl. No.: 09/123,307

(22) Filed: Jul. 28, 1998

Related U.S. Application Data

(63) Continuation-in-part of application No. 08/877,071, filed on Jun. 17, 1997.

(51) Int. Cl.$^7$ ................................................ G06T 1/60
(52) U.S. Cl. ............................ 345/530; 345/156; 713/1; 713/2
(58) Field of Search ................................. 345/508, 520, 345/530, 521, 115, 27, 168, 156; 713/1, 2

(56) References Cited

U.S. PATENT DOCUMENTS

| | | | |
|---|---|---|---|
| 4,121,283 A | | 10/1978 | Walker ........................ 345/340 |
| 5,229,758 A | * | 7/1993 | Hsu ............................. 345/27 |
| 5,519,825 A | * | 5/1996 | Naughton et al. .......... 395/173 |
| 5,625,386 A | * | 4/1997 | Howard et al. ............. 345/201 |
| 5,696,912 A | | 12/1997 | Bicevskis et al. ........... 395/308 |
| 5,781,228 A | | 7/1998 | Sposato ....................... 348/13 |
| 5,801,717 A | * | 9/1998 | Engstrom et al. ........... 345/508 |

OTHER PUBLICATIONS

PC 97 Hardware Design Guide, Microsoft Press, Chapter 3, pp. 1–29, 1966.*

* cited by examiner

*Primary Examiner*—Henry N. Tran

(57) ABSTRACT

A computer system has a selectable set-up feature to adjust the display screen image presented during power on self test, or POST. The computer memory contains two sets of information that can be presented on the video display screen. An application of power to the computer system, a first form of information from a first video memory area is normally presented to the computer output device. This information is simpler in format, requiring less memory. Also, upon the application of power to the computer system, flags or semaphores direct substantially all of a detailed or verbose screen information from initialization, configuration, or other boot-time routines to a second video memory area while information in the first video memory area is presented on the display. Upon receiving one of a predetermined set of commands, the computer system switches from the first display to the second display, presenting the second verbose screen information on the video screen. The command may be internally generated upon execution of a group of instructions, or it may be received from an input device coupled to the computer system.

27 Claims, 6 Drawing Sheets

COMPUTER SYSTEM WITH POST SCREEN FORMAT CONFIGURABILITY

CROSS-REFERENCE TO RELATED APPLICATIONS

The present invention is a continuation-in-part of application Ser. No. 08/877,071, entitled "HIDDEN VERBOSE SCREEN," filed Jun. 17, 1997, which is hereby incorporated by reference.

BACKGROUND OF THE INVENTION

1. Field of the Invention

The present invention relates to computer systems and their operating systems, and more specifically to computer hardware configurations dependent on a selected operating system.

2. Description of the Related Art

During power up, power on self test (POST), and basic input/output system (BIOS) execution during the booting of the operating system, a typical computer system displays various information on the computer screen. A "Verbose" screen presents the user with information about the computer system during the initial stages of computer execution. BIOS has typically used the video input/output to prompt the user for passwords, and has accepted the computer set-up hot keys, and other functionality interacting with the user during the initial boot up of the computer system. Historically, the BIOS has performed a large amount of input/output processing, particularly video output processing. The BIOS also manipulates video hardware and memory while interactive input/output is processing. Most computer systems having a video display device include a full video buffer for output. The contents of the video buffer are displayed by the video graphics adapter. Output processing therefore requires providing a value to all the locations in the video buffer. However, the input/output processing during the initial BIOS execution is designed to present the user with options and receive user-generated commands that, generally speaking, may not be used frequently by many users. For example, hot keying during the BIOS execution is uncommon, since most such user activities can wait until the operating system has been loaded. The BIOS may prompt the user for passwords and other information, but this operation is typically fast and requires little memory. Even though the passwords may be entered before the operating system is loaded, these user-options normally do not require a full video screen buffer.

Video screen memory is high content memory and the use of a full video screen buffer for the verbose screen requires a dedication of memory space BIOS execution of video control processes can require a great deal of memory as well. Moreover, the loading of an entire verbose screen buffer, as well as the presentation of the verbose screen to the user on the video monitor, can extend the POST (Power On Self Test) execution time beyond the minimal levels.

As various software applications and hardware drivers are loaded into memory, it is also common to include icons on the display screen indicating that the application or driver is now available. This requires processing to determine screen location and to present the information to the user. This requires a great deal of memory processing space and time during BIOS.

SUMMARY OF THE INVENTION

A system according to the present invention includes two video buffers, one holding a cover or clean screen, and the other holding the verbose screen. The system also includes a selectable set-up feature that allows a system administrator or user to set a boot mode to either a verbose mode or a clean mode. The system administrator or user determines the boot mode before the user boots the computer system, or in an early stage of boot-up. When the computer system is in the verbose mode, the computer system presents the verbose screen during POST, displaying information obtained from the computer system during the initial stages of the computer execution. When the computer system is in the clean mode, however, the BIOS presents the cover screen to the user on the video monitor immediately, while setting up the verbose screen. Therefore, the verbose screen is not presented to the user immediately. Appropriate semaphores are also set.

According to the present invention, the BIOS can present the verbose screen by switching from one buffer to another as the situation dictates. For example, if the BIOS can access, boot, and launch the operating system directly, then the verbose screen need never be shown. If, however, the BIOS requires additional information from the user, for example, a password, or possibly responsive to a setup hot key, then the computer system can prepare the verbose screen in a hidden mode, and then switch the active screen from the cover screen to the verbose screen, hiding the setup of the password prompt.

In some embodiments, when in the clean mode, a system according to the present invention adds a logo or other BIOS defined screen to the cover or clean screen. The logo or cover screen is visible by the user during initial setup by the BIOS. The verbose screen, in contrast, is virtualized in a hidden mode until the verbose screen is completely prepared for presentation. In some embodiments, the logo screen while clean screen mode is implemented as a text graphics, requiring far less memory than the conventional graphic mode. Clean mode screen greatly reduces the memory that a memory buffer might require, while preserving the benefits of user interactivity during the BIOS execution. BIOS ROM and OPTION ROM activities can continue without interruption by the additional features of the present invention, but are not affected in any way by the addition of the second video buffer according to the present invention.

A system according to the invention also allows automatic transition to the verbose screen, notwithstanding the boot mode, if an error or interrupt is detected during POST.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 09/123,658, entitled "OWNERSHIP TAG ON POWER-UP SCREEN," by Paul I. Broyles, III, Rahul G. Patel and Mark A. Piwonka, filed Jul. 28, 1998;

U.S. application Ser. No. 09/123,672, entitled "METHOD FOR STORING BOARD REVISION," by Paul I Broyles, III and Mark A Piwonka, filed Jul. 28, 1998, U.S. Pat No. 6,405,311, issued Jun. 11, 2002;

U.S. application Ser. No. 09/071,127, entitled "A COMPUTER METHOD AND APPARATUS TO FORCE BOOT BLOCK RECOVERY," by Don it James, Jr., Randall L. Hess, and Jeffrey D. Kane, filed Apr. 30, 1998, U.S. Pat. No. 636,492, issued Mar. 26, 2002;

U.S. application Ser. No. 09/070,821, entitled "BOOT BLOCK SUPPORT FOR ATAPI REMOVABLE MEDIA DEVICES," by Paul J. Broyles and Don R. James, Jr., filed Apr. 30, 1998, U.S. Pat. No. 6,363,492, issued Mar. 26, 2002;

U.S. application Ser. No. 09/070,457, entitled "SECURITY METHODOLOGY FOR DEVICES HAVING PLUG AND PLAY CAPABILITIES," by Christopher E. Simonich and Robin T. Tran, filed Apr. 30, 1998, U.S. Pat. No. 6,301,665, issued Oct. 9, 2001;

U.S. application Ser. No. 09/070,942, entitled "METHOD AND APPARATUS FOR REMOTE ROM FLASHING AND SECURITY MANAGEMENT FOR A COMPUTER SYSTEM," by Manuel Novoa, Paul H. McCann, Adrian Chrisan and Wayne P. Sharum, filed Apr. 30, 1998, U.S. Pat. No. 6,223,284, issued Apr. 24, 2001;

U.S. application Ser. No. 09/070,866, entitled "A METHOD FOR FLASHING ESCD AND VARIABLES INTO A ROM, "by Mark A. Piwonka, Louis B. Hobson, Jeff D. Kane, and Randall L. Hess, filed Apr. 30, 1998, U.S. Pat. No. 6,073,206, issued Jun. 6, 2000;

U.S. application Ser. No. 08/634,413, entitled "FLASH ROM PROGRAMING," by Patrick It Cooper, David J. Delisle, and Hung Q. Le filed Jul. 19, 1996, U.S. Pat. No. 5,805,882, issued Sep. 8, 1998; and U.S. application Ser. No. 09/071,128, entitled "A UNIFIED PASSWORD PROMPT OF A COMPUTER SYSTEM," by Michael D. Garrett, Randall L. Hess, Chi W. So, Mohammed Anwarmariz, filed Apr. 30, 1998, U.S. Pat. No. 6,397,337, issued May 28, 2002; all of which are assigned to the assignee of this invention.

Computer System Overview

Figure 1:
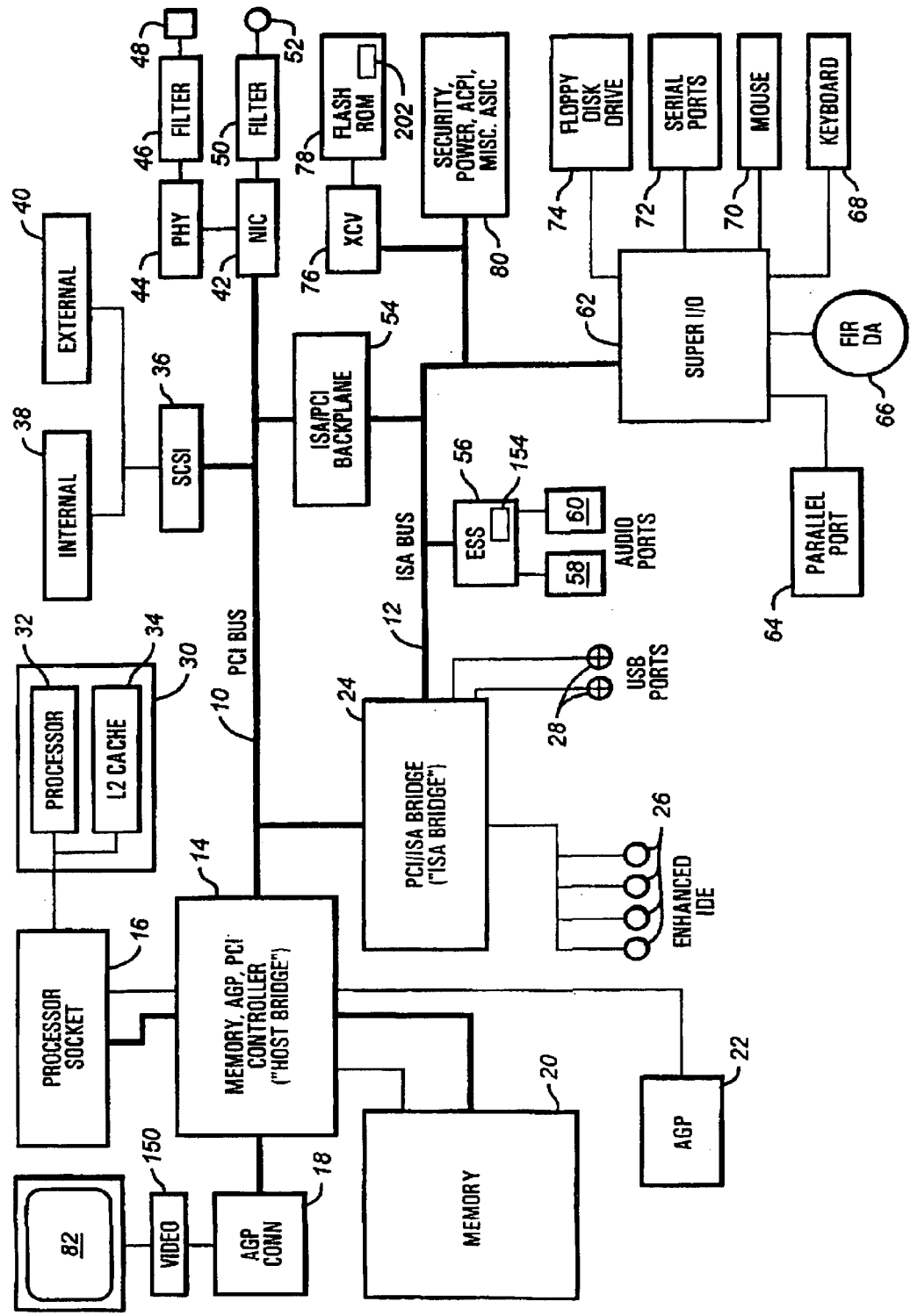
FIG. 1 is a schematic diagram of a computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed Host-Bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Integrated Circuit is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 is coupled to the AGP connector 18 through an AGP master or video card 150 for display of data by the computer system S. The video display 82 displays video and graphics data provided by a video display process running on either the processor module 30 or another by a PCI device bus master or PCI bridge device bus master via host bridge 14. Video or graphics data so provided may be stored in main memory or in a supplementary or extension memory module. Again, a wide variety of systems could be used instead of the disclosed system S without detracting from the spirit of the invention.

When processor module 30 is booted, a basic input output system (BIOS) is loaded and executed on processor module 30. According to the present invention, a processor associated with the BIOS permits presentation of either a verbose screen (FIG. 4) or a clean or logo screen (FIG. 5) on display 82 depending on circumstances and also on a selectable set-up feature.

Figure 4:
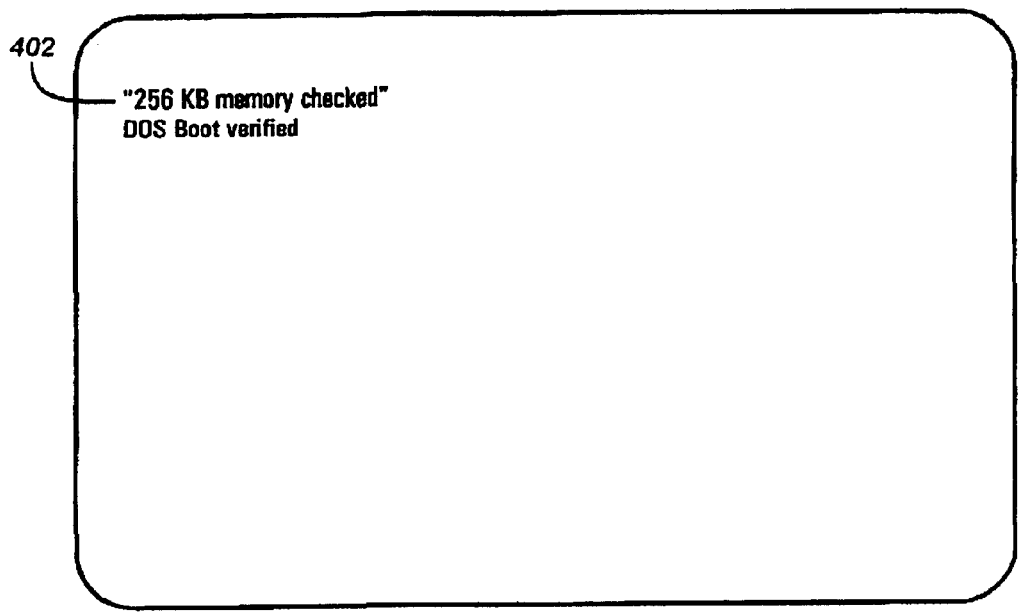
FIG. 4 shows a verbose screen on a computer system display.

According to the present invention, a control switch 160 is provided in the computer system S, preferably in flash ROM 78. The control switch is programmable to determine an initial mode of the display 82 during POST to be either a clean mode (FIG. 5) or a verbose mode (FIG. 4). The control switch 160 is preferably software-programmable by a routine accessible during an early stage of POST, and is stored in nonvolatile memory, for example flash ROM 78. Thus, unless reset by accessing the routine, the computer system S reverts to the boot mode stored in nonvolatile memory (i.e. flash ROM 78 ) upon each restart. In one embodiment, the routine is accessed during the setup stage of POST, by a user pressing a suitable key, such as the "F10" key, on the computer keyboard 68 during POST. The routine for this operation of the computer system S of the present invention is described in greater detail with reference to FIG. 7.

Although described in terms of a video buffer, in several embodiments each of the verbose screen video buffer and the clean screen video buffer may in fact be implemented as a number of different buffers. For example, odd and even buffers, or buffers derived from different images, may be included.

Figure 2:
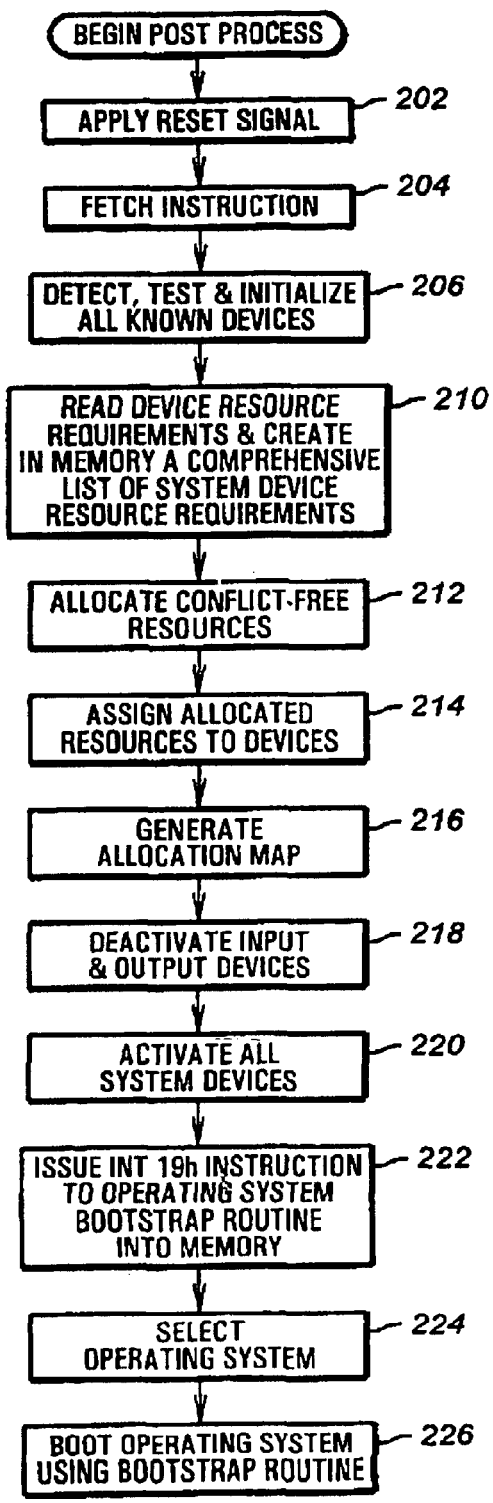
FIG. 2 is a flow chart illustrating POST execution of a computer system according to the prior art.

Referring now to FIG. 2, a flow chart representing a typical POST sequence, according to the plug-and-play system architecture, is shown. As stated previously, the POST and other BIOS routines are typically stored in a system ROM and shadowed (i.e., copied) into RAM for faster execution and wider data channels. The PCI specification requires shadowing and other bus specifications also strongly recommend it. At step 202, a reset signal is applied and remains active until power supply outputs have stabilized. The reset signal forces all device logic to a predefined state, insuring global initialization predictability. At step 204, a first instruction is fetched from a predefined restart address. The fetching of the restart address occurs when the reset signal is deactivated, normally as soon as power fluctuations have stabilized. The fetched address is the entry point of the POST program, typically in system ROM memory.

The POST routine is then shadowed in to RAM, where it may then be run more quickly. At step 206, the POST detects, tests, and initializes all known devices to the state for normal system operation. Initialization of detected devices is explained in detail below. In step 206, devices, including the interrupt controller, the DMA controller, and programmable timers, as well as other devices, are merely turned on, tested, and set to a default state (i.e., a "wait" or "wait for key" state) for the device, having no device configuration, IO space allocation, or resource assignment.

As part of the initialization, the POST then tries to turn all of the devices off, to determine which devices might be useful in finding and launching the operating system. Typically, devices might be useful in finding and launching the operating system cannot be deactivated by software; they are activated so long as power is applied to the system. Also, such devices cannot be reallocated, since they need specific, dedicated resources. By attempting to turn off the devices, only those that are useful for booting the operating system remain activated. These devices ("initial program load" devices) include the system ROM, and generally include a keyboard controller and a video adapter as well. All other devices are deactivated.

Because the purpose of the BIOS is to prepare the system for the booting of an operating system, devices are segregated into two groups: one group, the IPL devices, are determined to be needed for booting the operating system. The IPL devices typically cannot be deactivated, and typically require highly specific resources. As such the IPL devices cannot be configured by software. The other group of devices, which can be configured or deactivated by the software, are typically initiated and configured by the BIOS only when it is determined that an operating system other than Plug-and-Play compatible is to be booted. This is because Plug-and-Play compatible operating systems typically can perform their own hardware configurations; performing an initial configuration in the BIOS would be pointless since the operating system would reconfigure the system anyway.

The POST then turns the other devices back on, and sets them to a "wait" state (also known as the "wait for key" state). The devices remain in the wait state until isolated and configured by the BIOS. Step 206 is completed when the configurable devices are transitioned to the wait state. Isolation of Plug-and-Play devices is described below with reference to FIG. 3.

The IPL devices are initialized by performing any initialization routines contained within the IPL device ROMs. Then, the BIOS examines the operating system to determine whether any additional devices may be needed to load and launch the operating system. For example, if the operating system is not compatible with the Plug-and-Play methodology, then all devices must be activated and initialized; but when Plug-and-Play operating systems are used, only certain IPL devices that do not require configuration are used. Therefore, any necessary device is activated, and initialized according to its option ROM.

If the operating system cannot perform system configuration, the BIOS continues, configuring the system, and then launches the operating system before terminating. If the operating system can perform system configuration, the BIOS launches the operating system and terminates, allowing the operating system to continue with system configuration.

The system BIOS is designed to have access to system resource information, and therefore "knows" what system resources are available. The devices are isolated and are read to determine the resource requirements of the devices. In step 210 a comprehensive list of system resources is created in memory, and the system devices are configured. In step 212, conflict-free resources are allocated, and in step 214, an allocation map storing the system configuration is generated and verified, completing the configuration process. At step 218, all system devices are activated and deactivated, to identify any additional devices needed to boot the operating system (devices needed to boot the operating system typically cannot be deactivated, while all other devices can), and if any are found steps 206–218 are repeated to allocate the necessary resources to the necessary devices. At step 220, all system devices are activated. At step 222, an INT 19h command is issued by the POST to load the bootstrap routine into memory. The OS bootstrap routine actually loads the operating system, and hooks necessary memory locations to the operating system pointers. The operating system is selected at step 224 (usually, only one is available, although more may be present and identified as being useable only if no preferred operating system is present). At step 226, the selected operating system is booted using the bootstrap routine.

System configuration assigns system resources to configurable devices, avoiding conflicting assignments and ensuring that each device receives adequate resource allocation to perform its functions. System configuration includes device ROM shadowing and initialization, device isolation, resource requirement identification, available system resource determination, and resource allocation. Typically, system configuration begins when all configurable devices are in the wait state. Any activated devices that have option ROMs but that have not been initialized, are initialized according to their option ROMs. A double check is performed to determine whether any Plug-and-Play ISA devices have been activated but not initialized, and if any such ISA devices are found and have option ROMs corresponding thereto, the option ROMs are read for initialization code which is then executed. All devices in the system are checked for device ROMs and are initialized from the device ROMs.

Figure 3:
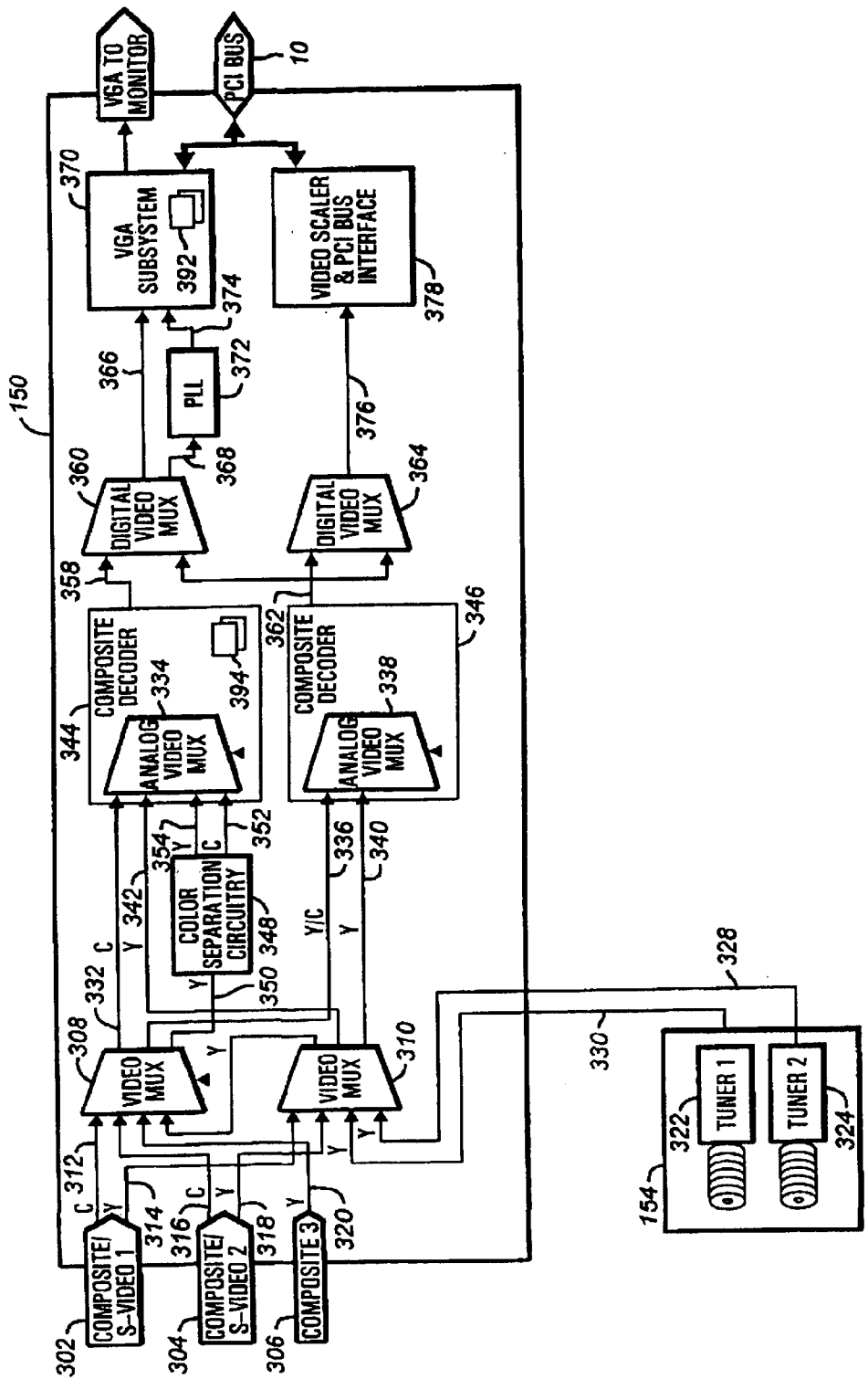
FIG. 3 is a schematic diagram of a video card and portions of the audio card of the computer system of FIG. 1.

Turning to FIG. 3, a schematic diagram of a typical AGP master or video card 150 and portions of the audio card 154 (FIGS. 1 and 3) of the computer system S is shown. The inputs to the video card 150 include three composite video signals provided through Y1C video connectors, composite_1 302, composite_2 304, and composite_3 306. The constituent signals of the three input composite signals are provided to a pair of video multiplexers 308 and 310. A chrominance signal on line 312 from the composite_1 signal 302 is provided to video multiplexer 310, and a luminance signal on line 314 of the composite_1 signal 302 is provided to video multiplexer 310. The chrominance signal on line 316 of the composite_2 signal 304 is provided to video multiplexer 308, and a luminance signal on line 318 of the composite_2 signal is provided to video multiplexer 310. The composite_3 signal 306 includes a luminance signal on line 320 which is provided to video multiplexer 308. Tuners 322 and 324 located on the audio card 154 of the computer system S also provide input luminance signals on lines 328 and 330 to video multiplexer 310. Other conventional devices that are provided on the audio card 154 are not shown as the audio card 154 as they are not critical to an understanding of the present invention.

A signal on line 332 outputted from video multiplexer 308 is provided to a primary analog video multiplexer 334. Video multiplexer 308 also provides a Y/C signal on line 336 to a secondary analog video multiplexer 338. Video multiplexer 310 provides signals on lines 340 and 342; the signal on line 342 is provided to the primary analog video multiplexer 334, and the signal on the other line 340 is provided to the secondary analog video multiplexer 338. The analog video multiplexer 334 is integrated into a primary video composite decoder 344, and the secondary analog video multiplexer 338 is integrated into a secondary video composite decoder 346. The primary decoder 344 of the present invention may or may not include color separation circuitry, as desired.

The video card 150 of the computer system 10 of the present invention includes color separation circuitry 348 external to the primary decoder 344. The color separation circuitry 348 receives a composite signal on line 350 as an input from video multiplexer 308 and outputs a chrominance signal on line 352 and a luminance signal on line 354 to the primary analog video multiplexer 334 of the primary decoder 344. The color separation circuitry 348 includes a digital comb filter, by which video information is converted from analog to digital and back to analog. The video signal from decoder 344 is provided on line 358 a digital video multiplexer 360. Similarly, an output video signal on line 262 of the secondary video composite decoder 346 is provided to a digital video multiplexer 364.

The primary digital video multiplexer 360 provides two outputs, on lines 266 and 268. The output on line 266 is provided directly to the VGA subsystem 370. The output on line 268 is directed to a phase-locked-loop 372 (PLL). The PLL 372 supplies a clock signal on line 324 to the VGA subsystem 370. The VGA subsystem 370 has two memory areas; one area is used as an off-screen memory area for storing video information, such as font information and data yet to be displayed. The other memory area of VGA subsystem 370 is used to store data which is currently being displayed. The VGA subsystem 370 also includes a VGA controller. In displaying data, the VGA controller reads from the off-screen memory, scales the data if needed, performs color space conversion, and then sends the data through a digital-to-analog converter (DAC) to the display.

In the secondary path, the secondary digital video multiplexer 364 provides a signal on line 276 to a video scaler and PCI bus interface 378. When data is sent over the secondary path, the data is downscaled if needed and then burst over the PCI bus 120 into the off-screen memory area of the video memory. The secondary path is typically used for picture-in-picture (PIP) functionality or pulling up web pages while watching television on the display 82 which are encoded in the vertical blanket interval (VBI).

Therefore, typically, the video display device 82 is a primary output device that cannot be turned off during the BIOS. The display screen 82 is always active, and is always capable of presenting an image provided to it. In the event a blank screen may be present. Various peripheral devices can attempt to control the video display during the BIOS, since the operating system has not been loaded and launched and thus cannot control the peripherals.

Referring now to FIG. 4, a verbose screen is shown. The verbose screen typically includes a running memory count 402 showing the number of kilobytes of memory that have been successfully tested and other information. Examples include indications of the beginning of the operating system, various copyright notices can presented, activation of various device ROMs, testing of extended memory, and other information indicating a successful start-up of the computer S which are presented to the display monitor 82. Background color or designs are, in some systems, dynamically updated to present a moving graphic image during BIOS execution.

These activities not only occupy additional memory, but require additional BIOS execution time. According to the present invention, however, the page buffer corresponding to the video image is hidden, unless activated by the BIOS routine itself or a special circumstance. Such a circumstance can be indicated by the user hitting a key on keyboard, or by an error. Thus unless there is a special need, the verbose screen of FIG. 4 is hidden during POST.

Figure 5:
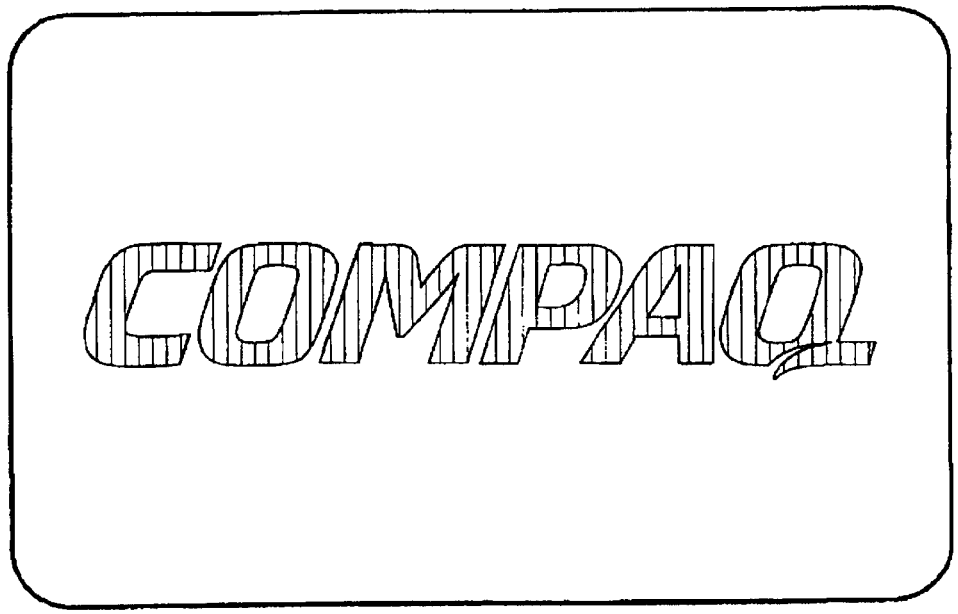
FIG. 5 shows a cover screen formed on a computer system display.

Referring now to FIG. 5, a clean mode display for cover screen of monitor 82 according to the present invention is shown. The cover screen is a suitable specified graphical representation of text graphics, occupying far less memory and requiring far less time to present. The cover screen may show, in different embodiments, different logos or images of a static nature. As shown in FIG. 5, the cover screen displays a logo which is a registered trademark of Compaq Computer Corporation, assignee of the present application. The cover screen furnished in the clean mode requires only a small number of bytes of memory to store, since it is stored as a text image.

Figure 6:
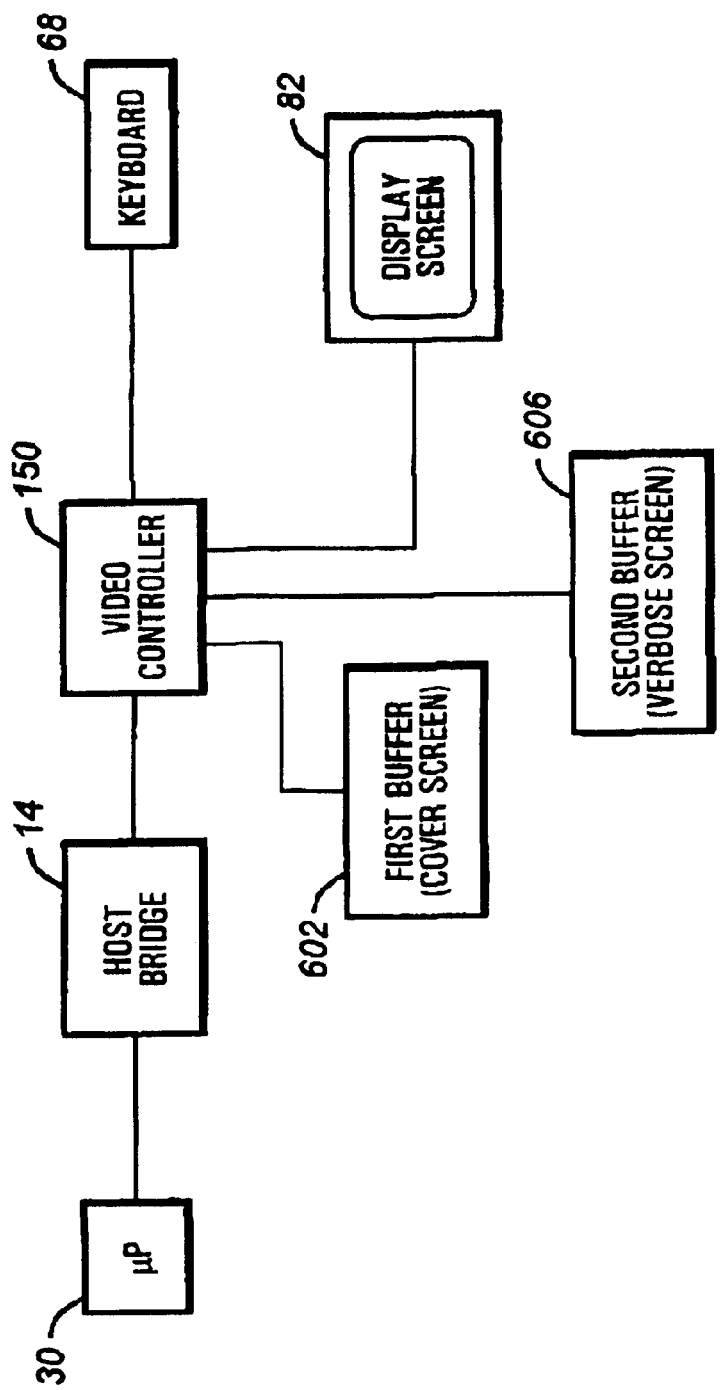
FIG. 6 shows portions of the computer system of FIG. 1 involved in the transfer or switching from a cover screen to a verbose screen according to the present invention.

Referring to FIG. 6, the switching from the cover screen to the verbose screen for display 82 upon receiving either a user signal or a BIOS signal commanding a switch is shown. The user signal is generated when the user strikes a key on the keyboard 68 or otherwise indicates that data is to be input to the BIOS. Such a user signal may be required when a user desires to install a different BIOS or operating system into the programmable system ROM, or when the system is to emulate a different platform. The BIOS signal commanding a switch from the cover screen to the verbose screen typically indicates a successful loading and launching of the operating system, or that an error has been encountered during the loading and launching of the operating system.

Referring now to FIG. 6, the system S initially determines the boot mode. If the boot mode is determined to be that for a verbose screen, i.e. the computer system S is in the verbose mode, then a first memory location, indicated as a buffer 602 storing the cover screen displayed in FIG. 5, is set as inactive. A second memory location, indicated as buffer 606 storing the verbose screen of FIG. 4, is set as active by a controller on video card 150 (FIG. 3) based on data received. As has been discussed, the verbose screen typically is set as a default active display screen on display 82. If the boot mode is determined to be clean, i.e. the computer system S is in the clean mode, then the first buffer 602 storing the cover screen is set as active.

In some instances, when the computer system S is in the clean mode, an interrupt or error may be detected during POST. In such an event, it may be necessary to transition the computer system S to the verbose mode to display an appropriate error message or to branch to an appropriate error routine. An interrupt signal from a peripheral interrupt controller in host bridge 14 is received by the video display card 150 when the display 82 is in the clean mode. The interrupt signal received from the peripheral interrupt controller has been generated by the microprocessor 30 in response either to an error detected in the BIOS execution code, or else is generated by the microprocessor in response to an interrupt signal received from the keyboard 68.

Upon receiving the interrupt signal, the controller resets the verbose screen switch to its alternate value, commanding the video display 82 and video card 150 to transition into the verbose state. In the verbose state, the video card 150 begins reading from the second buffer 606 storing the verbose screen. This can be either done immediately or upon the next vertical blanking interval. Thereafter, once transitioned to the verbose state, the video display 82 under control of video card 150 continues to display the verbose image in the second video buffer 606. The verbose display of FIG. 4 so formed continues until the BIOS has terminated execution or until again set by a subsequent rebooting of the system S.

The switch from the clean mode to the verbose mode upon detecting an error or interrupt is only within volatile active memory. Therefore, unless the default value of the switch is set in switch 160 is in nonvolatile memory, upon the next boot the computer system S reverts to the boot mode stored in the nonvolatile memory.

An option is included in the BIOS to toggle between the clean mode and the verbose mode. Initially, the option toggle default may be set to clean mode, so that, without further action by the user or command from the BIOS, the clean mode clean screen buffer is presented on the video output device 82. The monitor 82 presents an uncluttered visually pleasing boot screen that may have a logo or other video image, defined either in BIOS or in a system ROM stored routine. The amount of text displayed may be minimal, as is the amount of other information. The clean screen video buffer 602 contains a minimal amount of information which defines the entire screen.

Sound and motion are either suppressed or not included in the clean screen, and therefore there are no beeps, memory count, option ROM banner, or other motion or sound that might require additional memory. The single traditional beep, error messages, and other messages prompted by the F1 key that are generally available in the boot screen are suppressed.

The verbose screen, in contrast, operates normally, when specified. Semaphores are set in memory such that any BIOS or operating system setup routine sending signals to the video screen or video controller are directed to the hidden verbose screen buffer 606 that is not presented to the user. The clean screen is displayed while the verbose screen is being updated. If there is a system error or if the user hits a key, or the operating system has been loaded fully and has begun execution, the system automatically switches to the verbose screen. Switching is straightforward since the video graphics display screen simply reads information from the buffer 606. The two video screens are virtualized in memory as video memory pages, and clean mode graphics are implemented as text graphics, where characters are redefined and mapped out onto the screen.

The video BIOS is in effect tricked into thinking that the hidden screen is the active screen, and therefore all normal video I/O will be rerouted to the hidden verbose screen while the BIOS maintains control over the displayed (clean) screen Video I/O done by third party option ROMS, even direct memory manipulation, is hidden yet is saved and is effected abruptly when indicated. As discussed, this may occur when the user hits a key, a system error occurs, or the operating system successfully loads and boots.

Figure 7:
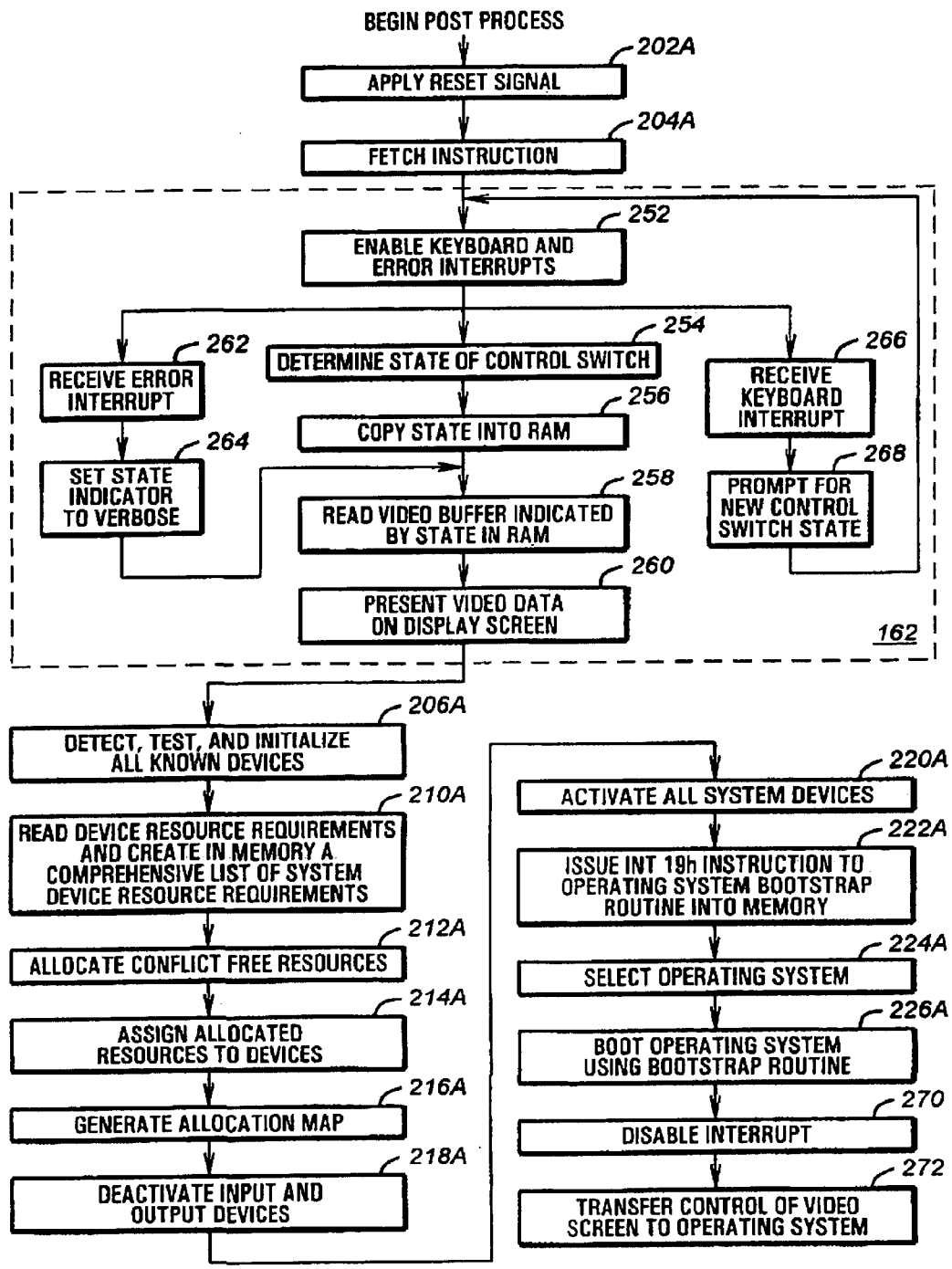
FIG. 7 is a flow chart illustrating POST execution according to the present invention.

Referring now to FIG. 7, a revised POST process according to the present invention is shown. At step 202*a*, a reset signal is applied. The reset signal remains active until the power supply outputs have stabilized. At step 204*a*, when the reset signal is deactivated, a first instruction is fetched from a predefined start address. The fetched address is the entry point of the POST program, running either from system ROM 158 or a shadow of the ROM code running from RAM.

Preferably, the POST routine is shadowed into RAM, where it may be run more quickly. At step 252, a keyboard interrupt and an error interrupt are both enabled. Enabling interrupts allows hardware and software events to be detected by the processor. At step 252, the POST process determines the state of the control switch 160 within the Flash ROM 158. Because the control switch 160 is stored in a non-volatile region of memory, the computer system boots in the same manner each time, until the value of the control switch 160 is changed. The state of the control switch 160 is copied into RAM in step 256. Copying the state into RAM has several advantages. First, data stored in RAM is typically accessible with less latency. Second, values in RAM may be overwritten dynamically without altering the static information stored in the non-volatile memory. Thus, processes (and in particular, error interrupts) can overwrite the dynamic value of the control switch 160 stored in the RAM.

The video buffer indicated by the state of the control switch stored in RAM selectively toggles the video buffer pointer at step 258. The video buffer pointer controls which video buffer within video card 150 (FIG. 1) is accessed and presented to the video screen. Presentation of the video information is accomplished at step 260.

The video information presented at step 260 remains on the screen until POST is completed, a keyboard interrupt is detected, or an error interrupt is detected. At step 206*a*, all known devices in the computer system are detected, tested, and initialized. Initial algorithm of devices may be accomplished according to the Plug and Play initialization algorithm. Each device in the computer system is turned on, tested, set to a default state, and then turned off to determine which devices might be useful in finding and launching the operating system. In some initialization algorithms, each device selectively reports a signature enabling the BIOS to allocate appropriate resources to the device.

Resource requirements are read from each device, and a configuration space within memory is created by the POST process at step 210*a*. Conflict free resources are allocated at step 212*a*, and are assigned to devices at step 214*a*. An allocation map is generated at step 216*a*, input and output devices are deactivated at step 218*a*, and finally all system devices are activated at step 220*a*. An INT 19*h* instruction is issued to an operating system boot strap routine located in memory, at step 222*a*. The boot strap routine selects an operating system at step 224*a*, and then boots the operating system using the boot strap routine at step 226*a*. At step 270, the keyboard and error interrupts, which were enabled at step 252, are disabled. Finally, at step 272, control of the video screen is transferred to the operating system (along with control of the entire computer system).

While the above description of the POST routine in reference to FIG. 7 follows the ordinary interrupt-free progress of the POST process, interrupts occurring between step 252 and 270 cause other processes to be executed. If a keyboard interrupt is received, indicating that a user has pressed a key on the keyboard or, if desired, performed an action with a mouse, control proceeds from step 266 to step 268. At step 268, a keyboard interrupt handler is executed. The keyboard interrupt handler prompts a user for various information, typically including a password or other security or identity checking data. If the user fails to authenticate permitted access to the switch 160 within the Flash ROM 158, control returns to step 254, the keyboard interrupt remaining enabled. If, however, the user adequately identifies and authenticates access to the control switch 160 and the Flash ROM 158, the user is prompted for a toggle indicator. If the toggle indicator is valid, the state of the control switch stored within the Flash ROM 158 is incremented or toggled to its next value. If the Flash ROM 158 contained a control switch 160 pointing to the cover screen in the first buffer 602 (FIG. 6), then the keyboard interrupt handler changes the data to point to the Verbose screen in the second buffer 606. If the control switch 160 contained a pointer to the second buffer 606, containing the Verbose screen, then the keyboard interrupt handler toggles the control switch 160 to point to the first buffer 602, containing the cover screen (FIG. 5). The keyboard interrupt handler has access to the Flash ROM 158, and can change static values non-volatility.

If an error is detected between step 252 and step 270, i.e. when the error interrupt is enabled, the error interrupt is detected at step 262. The state indicator in the RAM shadow is set to point to the verbose screen in the second buffer 606 (FIG. 6). However, the non-volatile control switch 160 within the Flash ROM 158 is not altered during an error interrupt. At step 258, the video pointer within the video card 150 is selectively switched to point to the verbose screen if the pointer had been pointing to the cover screen. The video data in the verbose screen is presented on the video device 40 at step 260. Typically, this contains an error message informing the user of the error encountered during the POST process. From step 260, control proceeds to the normal POST process, typically to an early stage thereof, to allow the POST process to proceed anew with adjustments made after the step 260 was encountered.

A suitable code for the routine 162 of FIG. 7 is as follows:

```
;************************************************************************
;
;    dPaintCleanScreen - Switches to the clean screen and paints
;    it.
;
;    Entry: None.
;    Exit: Boot screen is beautiful.
;    Regs: Flags.
;
;------------------------------------------------------------------------
dPaintCleanScreen proc near
    pusha
```

-continued

```
        push    ds
        push    es
;Configure display for 8-dot wide characters.
        pushf                           ; Save interrupt state
        cli                             ; Disable interrupts
        mov     dx,3C4h                 ;;; Sequencer I/O addr.
        mov     ax,0100h                ;;;
        out     dx,ax                   ;;; Synchronous reset.
        mov     al,1                    ;;;
        out     dx,al                   ;;;
        inc     dx                      ;;;
        in      al,dx                   ;;;
        or      al,1                    ;;; Setup 8-dot wide characters.
        out     dx,al                   ;;;
        mov     dl,0CCh                 ;;; DX = 3CCh.
        in      al,dx                   ;;;
        and     al,11110011b              ;;; Use 25.172MHz dot clock.
        mov     dl,0C2h                 ;;; DX = 3C2h.
        out     dx,al                   ;;;
        mov     dl,0DAh                 ;;; DX = 3DAh.
        in      al,dx                   ;;; Reset the attribute controller.
        mov     dl,0C0h                 ;;; DX = 3C0h.
        mov     al,33h                    ;;;
        out     dx,al                   ;;;
        xor     al,al                   ;;; Set horizontal pel pan value
        out     dx,al                   ;;;
        mov     dl,0C4h                 ;;; DX = 3C4h.
        mov     ax,0300h                ;;;
        out     dx,ax                   ;;; Clear synchronous reset.
        popf                            ; Restore previous interrupt state
;Setup 9-bit character codes.
        mov     bl,00100000b              ; Setup 9-bit character codes.
        mov     ax,1103h                ;
        int     10h                     ;
        mov     bx,0712h                ; Ignore color plane 3.
        mov     ax,1000h                ;
        int     10h                     ;
;Set to text page 3
        xnov    ax,0500h + CSCREEN_PAGE
        int     10h
;Set background color
        mov     bx,CSCREEN_BGCOLOR  ; BX = Color #
        mov     dh,034h                 ; DH = Red Intensity
        mov     cx,03434h               ; CH = Green Intensity
                                        ; CL = Blue Intensity
        mov     ax,1010h                ; AX = "Set DAC Register"
        int     10h                     ; Yeehaw!
        mov     ax,0600h                ; AX = 0600h = "Init Window"
        mov     bh,CSCREEN_BGCOLOR SHL 4; BGColor = White; FGColor = Black
        xor     cx,cx                   ; Start @ extreme upper left
        mov     dx,184Fh                ; Go to extreme lower right
        int     10h                     ; Dynomite!
;Redefine character sets and display graphics
        push    cs                      ; } ES=CS
        pop     es                      ; }
        push    CSCREEN_SEG             ; }DS=Segment of Cleanscreen
        pop     ds                      ; }
        lea     si,es:[TextGraphicsData]; SI = &Text Graphics data
        xor     dx,dx                   ; Start @ character 0
pcs_tg_mainloop:
        cmp     si,offset TextGraphicsDataEnd
        jae     pcs_tg_done             ; If no more data, exit loop
        mov     al,es:[si.NumRows]        ; AL = Rows
        mov     ah,es:[si.NumCols]        ; AH =Cols
        push    ax                      ; Save row, column
        mul     ah                      ; AX = max character number
        mov     cx,ax                   ; CX=AX=nuinber of characters
        lea     bp,es:[si.CharGenData]    ; BP = &Character Generator Data
        mov     ax,1100h                ; AX = "Char Generator:Block Load"
        mov     bx, (TG_BYTESPERCHAR SHL 8) OR TG_CHARBLOCK
                                        ; BH=16 byte/char; BL = Load block 4
        push    cx                      ; Save CX
        push    dx                      ; Save DX
        int     10h                     ; Load character set
        pop     dx                      ; Restore DX = current char offset
        pop     bp                      ; Restore BP = # chars in this block
        mov     bl,es:[si.StartRow]       ; BL = Rows
        dec     bl                      ; Make BL 0-based
        mov     bh,es:[si.StartCol]       ; BH = Cols
```

-continued

```
        dec     bh                              ; Make BH 0-based
        movzx   di,bh                           ; DI=Column
        shl     di,1                            ; DI=DI*2=Byte offset from Row start
        mov     al,160                          ; AL=160
        mul     bl                              ; AX=160*ROW
        add     di,ax                           ; DI=Starting address of graphics
        pop     ax                              ; AL=maxrow; AH=maxcol
        mov     bh,es:[si.ColorNumber]          ; BH = Color #
        pusha                                   ; Save all
        movzx   bx,bh                           ; BX = Color number
        mov     dh,es:[si.RedIntensity]         ; DH = Red Intensity
        mov     ch,es:[si.GreenIntensity]       ;CH = Green Intensity
        mov     cl,es:[si.BlueIntensity];       CL = Blue Intensity
        mov     ax,1010h                        ; Ax = "Set DAC Register"
        int     10h                             ; Woohoo!
        popa                                    ; Restore all
        or      bh, (CSCREEN_BGCOLOR SHL 4) OR 00001000b
                                                ; BH = Character attribute
                                                ; (Bit3 = Load alternate char set)
pcs_tg_rowloop:
        movzx   cx,ah                           ; CX=number of columns
        push    di                              ; Save row start
pcs_tg_colloop:
        mov     bl,dl                           ; BL = character offset
        mov     word ptr ds:[di],bx             ; Display character
        add     di,2                            ; Go to next column
        inc     dx                              ; Update DX to next character
        loop    pcs_tg_colloop                  ; Next column
        pop     di                              ; Restore row start
        add     di,160                          ; Update DI to next row.
        dec     al                              ; Decrement row counter
        or      al,al                           ; Q: Last row?
        jnz     pcs_tg_rowloop                  ; N: Next row
        shl     bp,4                            ; BP=BP*16=# char gen bytes in block
        lea     si, [si+bp+TgHeaderSize]        ; Bump SI to next block
        jmp     pcs_tg_mainloop                 ; Go do next graphic
pcs_tg_done:
        ;Fool Video BIOS into thinking page 0 is active.
        push    40h                             ; }
        pop     ds                              ; } DS = segment of BDA
        mov     word ptr ds:[4eh],0             ; mem offset of 'active' page
        mov     byte ptr ds:[62h],0             ; active 'page num'
        pop     es
        pop     ds
        popa
        ret                                     ; return to caller
dPaintCleanScreen endp
;****************************************************************
;       dTerminateCleanScreen - Switches out of clean screen
;
;       Entry:  None.
;       Exit: Back to normal screen
;       Reqs: Flags.
;
;----------------------------------------------------------------
dTerminateCleanScreen proc near
        pusha
        mov     ah,03h                          ; AH=3="Read Cursor Position"
        xor     bh,bh                           ; BH=0=Video Page 0
        int     10h                             ; DH=Row, DL=Column
        push    dx                              ; Save page 0 cursor position
        mov     ah,0fh                          ; Prepare to read video state
        int     10h                             ; Read it
        or      al,80h                          ; Don't erase VRAM upon set mode
        xor     ah,ah                           ; AH=0="Set mode"
        int     10h                             ; go!
        pop     dx                              ; DX=old page 0 cursor position
        xor     bh,bh                           ; BH=page 0
        mov     ah, 02h                         ; AH=2="Set Cursor Position"
        int     10h                             ; DH=Row, DL=Column
        popa
        ret
dTerminateCleanScreen endp
;****************************************************************
dcbEnablecboot? proc near
        pusha
        farcall rnvsVerifyChecksum              ;Q: CMOS valid?
        jc      ec_disable                      ; N: Disable clean boot.
        mov     ax,POST_TERSE_BYTE              ;AX = &Post Terse/Verbose Byte
```

```
      farcall      rnvsRead                  ;BL =- Post Terse/Verbose Byte
      test         bl,POST_TERSE_BIT ;Q: Terse mode desired?
      jz           short ec_disable           ;   N: Disable clean boot.
                                              ;   Y: Continue . . .
      mov          ah,0fh                     ;AH=DF="Get Current Display Mode"
      int          10h                        ;AL=current display mode
      and          al,07Fh                    ;   ignore high bit
      cmp          al,3                       ;Q:Acceptable text mode?
      ja           short ec_disable           ;  N: Prob'ly mono adapter installed,
                                              ;     . . . diable coot and bail.
ec_enable:                                    ;) Y: Set ZF=NDT ZERO and exit.
      mov          al,-1                      ;)
      or           al,al                      );
      jmp          short ec_done              ;)
ec_disable;
      xor          al,al                      ; Set zero flag - "normal boot"
ec_done:
      popa
      ret
dcbEnableCboot? endp
```

From the foregoing, it can be seen that the computer system S is provided with a selectable screen format during POST. The video display can be set to be a clean screen, requiring less memory processing time during performance of the BIOS. If desired, the display may be set to be that of the more detailed information of the verbose screen. Further, the computer system S can be directed on command to switch or change the screen format, should the need arise, or in the event of an error or interrupt.

The foregoing disclosure and description of the invention are illustrative and explanatory thereof, and various changes in number of variables, number of parameters, order of steps, field sizes, data types, code elements, code size, connections, components, and materials, as well as in the details of the illustrated hardware and software and construction and method of operation may be made without departing from the spirit of the invention.

What is claimed is:

1. In a computer system having a processor, a bus coupled to the processor, a memory coupled to the bus, and a video output device coupled to the bus, the memory containing a first video buffer and a second video buffer and further containing a set of startup instructions, the video output device having a clean mode and a verbose mode, a method of selectively presenting a first and second video image to the video output device, the method comprising the steps of:
    executing the startup instructions, and upon execution of the startup instructions:
        determining whether the mode of the video output device is the clean mode or the verbose mode;
        when the video output device is in the clean mode, providing a first image to the video output device, the first image being defined by contents of the first video buffer; and
        when the video output device is in the verbose mode, providing a second image to the video output device, the second image being defined by the contents of the second video buffer.

2. The method of claim 1, further comprising a step of: determining the mode to be clean mode; and if a defined event occurs during system startup, switching the mode to verbose mode.

3. The method of claim 2, wherein the computer system includes a keyboard and wherein the defined event is a user key press.

4. The method of claim 2, wherein the defined event is a startup error.

5. The method of claim 2, further comprising the step of: determining the mode to be a default, stored mode, wherein said step of switching step leaves the default, stored mode unchanged.

6. The method of claim 1, wherein the computer system memory includes a disk memory.

7. The method of claim 1, wherein the contents of the second video buffer comprise a hidden screen, and further comprising, when in clean mode, executing the set of startup instructions as if the hidden screen is an active screen.

8. The method of claim 1, further comprising setting semaphores in the memory such that when the set of startup instructions are executed, signals sent to the video output device are directed to the second video buffer.

9. A computer system, comprising:
    a processor for executing system startup code; and
    a video output device coupled to the processor for displaying startup information in a clean mode or a verbose mode responsive to the system startup code when executed, the video output device comprising:
        a video output controller selectable to either a first state or a second state, and
        a display, the video output controller adapted to present on the display the contents of a first video buffer when the video output controller is in a first state, the video output controller adapted to present on the display the contents of a second video buffer when the video output controller is in a second state.

10. The computer system of claim 9, further comprising:
    a BIOS routine in the system startup code for accessing the first video buffer on system startup.

11. The computer system of claim 10, further including the BIOS routine containing code to switch from the clean mode to the verbose mode if a defined event occurs.

12. The computer system of claim 11, wherein the BIOS routine contains code recognizing a startup error as the defined event.

13. The computer system of claim 11, wherein the BIOS routine contains code recognizing a user indication as the defined event.

14. The computer system of claim 13, further including a keyboard.

15. The computer system of claim 14, wherein the user indication is a user key press.

16. The computer system of claim 9, further including:

semaphores capable of being set such that upon execution of the system startup code, signals sent to the video output device are directed to the second video buffer.

17. The computer system of claim 16, wherein:

the video output controller further comprises a programmable nonvolatile memory determining an initial state of the video output controller;

a memory containing a first video buffer containing information defining an image defined according to the clean mode and a second video buffer containing information defining an image defined according to the verbose mode.

18. The computer system of claim 9, wherein the contents of the second video buffer comprise a hidden screen when the video output controller is in the second state, and wherein the system startup code is executed as if the hidden screen is an active screen.

19. A non-volatile storage device containing startup code for a computer system to selectively display a clean image or a verbose image on a display during start-up of the computer system, the startup code causing the computer system to:

determine whether the mode of the video output device is the clean mode or the verbose mode;

when the video output device is in the clean mode, provide a first image to the video output device, the first image being defined by contents of the first video buffer; and when the video output device is in the verbose mode, provide a second image to the video output device, the second image being defined by the contents of the second video buffer.

20. The non-volatile storage device of claim 19, wherein the code further causes the computer system to:

determine the mode to be clean mode, and if a defined event occurs during system startup, switch the mode to verbose mode.

21. The non-volatile storage device of claim 20, wherein the code causes the computer system to recognize a user indication as the defined event.

22. The non-volatile storage device of claim 20, wherein the code causes the computer system to recognize a user key press as the defined event.

23. The non-volatile storage device of claim 20, wherein the code causes the computer system to recognize a startup error as the defined event.

24. The non-volatile storage device of claim 19, wherein the contents of the second video buffer comprise a hidden screen, and further comprising, when in clean mode, the startup occurring as if the hidden screen is an active screen.

25. In a computer system having a processor, a bus coupled to the processor, a memory coupled to the bus, and a video output device coupled to the bus, the memory containing a first video buffer and a second video buffer and further containing a set of instructions, the video output device having a clean mode and a verbose mode, a method of selectively presenting a first and second video image to the video output device, the method comprising the steps of:

making the verbose mode a default mode of the video output device;

determining whether the mode of the video output device is the clean mode or the verbose mode;

when the video output device is in the clean mode, providing a first image to the video output device, the first image being defined by contents of the first video buffer; and when the video output device is in the verbose mode, providing a second image to the video output device, the second image being defined by the contents of the second video buffer.

26. A computer system, comprising:

a processor for executing system startup code; and a video output device coupled to the processor for displaying startup information in a clean mode or a verbose mode responsive to the system startup code when executed, the verbose mode being the default mode of the video output device, the video output device comprising:

a video output controller selectable to either a first state or a second state, and a display, the video output controller adapted to present on the display the contents of a first video buffer when the video output controller is in a first state, the video output controller adapted to present on the display the contents of a second video buffer when the video output controller is in a second state.

27. A non-volatile storage device containing code for a computer system to selectively display a clean image or a verbose image on a display during, start-up of the computer system, the code causing the computer system to perform the steps of:

making the verbose mode a default mode of the video output device;

determining whether the mode of the video output device the clean mode or the verbose mode;

when the video output device is in the clean mode, providing a first image to the video output device, the first image being defined by contents of the first video buffer; and when the video output device is in the verbose mode, providing a second image to the video output device, the second image being defined by the contents of the second video buffer.

* * * * *